US012644788B2

(12) United States Patent (10) Patent No.: US 12,644,788 B2
Kanamaru et al. (45) Date of Patent: Jun. 2, 2026

(54) PRESSURE SENSOR MODULE AND DISPENSING DEVICE HAVING A DISTORTION DETECTION UNIT

(71) Applicant: Hitachi High-Tech Corporation, Tokyo (JP)

(72) Inventors: Masatoshi Kanamaru, Tokyo (JP); Takanori Aono, Tokyo (JP); Tatsuya Yamasaki, Tokyo (JP); Yoichiro Suzuki, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 290 days.

(21) Appl. No.: 18/279,448

(22) PCT Filed: Apr. 11, 2022

(86) PCT No.: PCT/JP2022/017532
§ 371 (c)(1),
(2) Date: Aug. 30, 2023

(87) PCT Pub. No.: WO2022/239589
PCT Pub. Date: Nov. 17, 2022

(65) Prior Publication Data
US 2024/0133757 A1 Apr. 25, 2024
US 2024/0230441 A9 Jul. 11, 2024

(30) Foreign Application Priority Data

May 13, 2021 (JP) ................................. 2021-081572

(51) Int. Cl.
*G01L 9/00* (2006.01)
*G01N 35/10* (2006.01)
(52) U.S. Cl.
CPC ........ *G01L 9/0054* (2013.01); *G01N 35/1009* (2013.01)

(58) Field of Classification Search
None
See application file for complete search history.

(56) References Cited

U.S. PATENT DOCUMENTS 4,459,855 A 7/1984 Yamagami
4,825,876 A * 5/1989 Beard ................. G01L 19/0084
439/930
(Continued)

FOREIGN PATENT DOCUMENTS

JP 58-28876 A 2/1983
JP 7-174654 A 7/1995
(Continued)

OTHER PUBLICATIONS

International Search Report (PCT/ISA/210) issued in PCT Application No. PCT/JP2022/017532 dated May 17, 2022 with English translation (6 pages).

(Continued)

*Primary Examiner* — Peter J Macchiarolo
*Assistant Examiner* — Jermaine L Jenkins
(74) *Attorney, Agent, or Firm* — Crowell & Moring LLP

(57) ABSTRACT

A pressure sensor module and a dispensing apparatus improving accuracy of pressure measurement are provided. A pressure sensor module includes: a flow channel substrate in which a flow channel and a branch channel are formed; and a distortion detection unit configured to detect a pressure. The branch channel is branched from the flow channel and is connected to the distortion detection unit at one end of the branch channel. The distortion detection unit is disposed at least partially via a bond layer to block the one end of the branch channel. A protrusion is provided to surround the one end of the branch channel.

12 Claims, 12 Drawing Sheets

(56) References Cited

U.S. PATENT DOCUMENTS

| | | | |
|---|---|---|---|
| 5,086,777 | A | 2/1992 | Hishii |
| 2018/0252606 | A1 | 9/2018 | Kishimoto |
| 2019/0078914 | A1 | 3/2019 | Doering et al. |

FOREIGN PATENT DOCUMENTS

| | | | |
|---|---|---|---|
| JP | 9-126925 | A | 5/1997 |
| JP | 2000-111435 | A | 4/2000 |
| JP | 2001-201415 | A | 7/2001 |
| JP | 2014-235106 | A | 12/2014 |
| JP | 2018-146318 | A | 9/2018 |
| JP | 2020-71191 | A | 5/2020 |

OTHER PUBLICATIONS

Japanese-language Written Opinion (PCT/ISA/237) issued in PCT Application No. PCT/JP2022/017532 dated May 17, 2022 with English translation (8 pages).

Japanese-language International Preliminary Report on Patentability (PCT/IPEA/416 & PCT/IPEA/409) issued in PCT Application No. PCT/JP2022/017532 dated Nov. 15, 2022, including Annexes with partial English translation (15 pages).

Extended European Search Report issued in European Application No. 22801005.4 dated Mar. 11, 2025 (9 pages).

* cited by examiner

[FIG. 1]
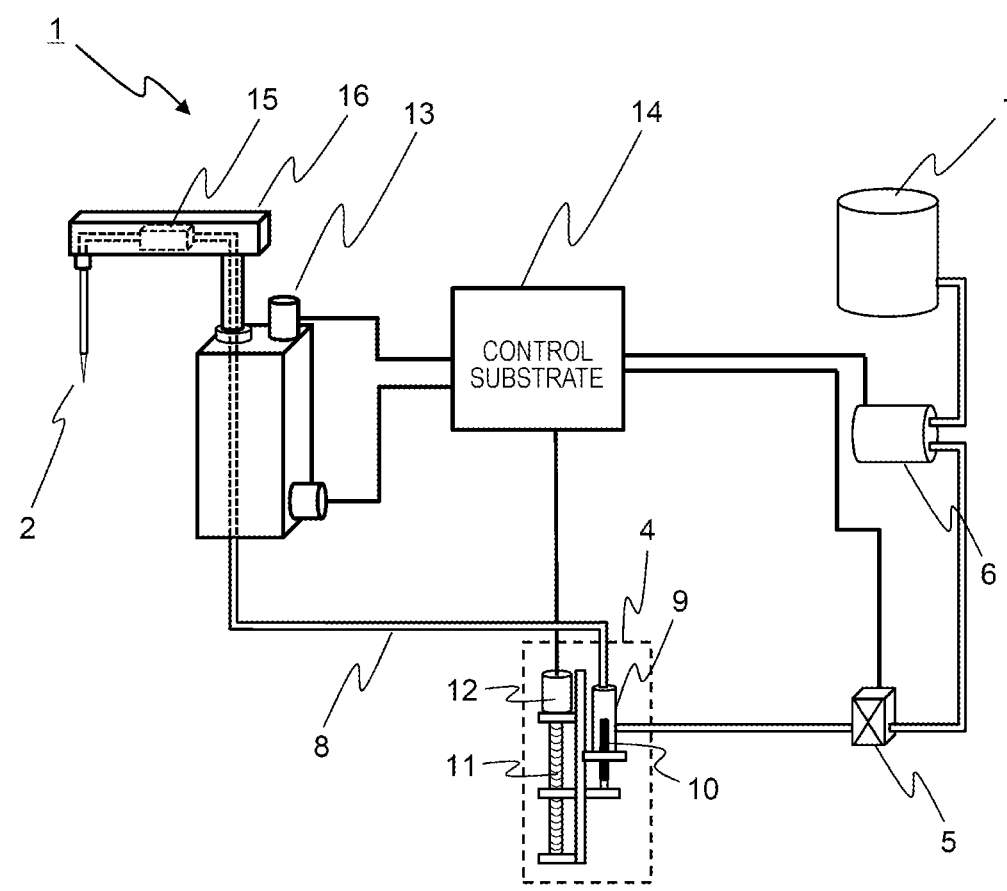
[FIG. 2]
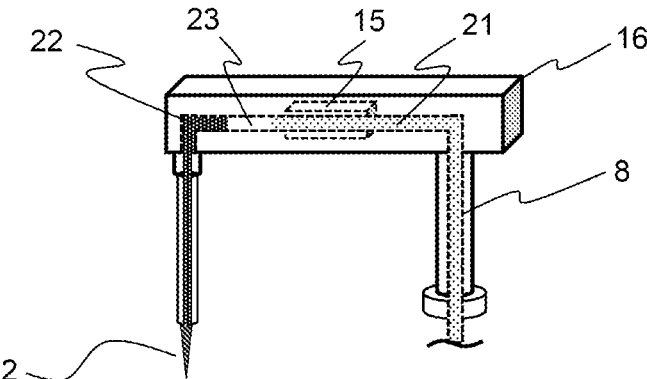

PERSPECTIVE VIEW

SECTIONAL VIEW

15b                                          PERSPECTIVE VIEW

SECTIONAL VIEW

[FIG. 6]
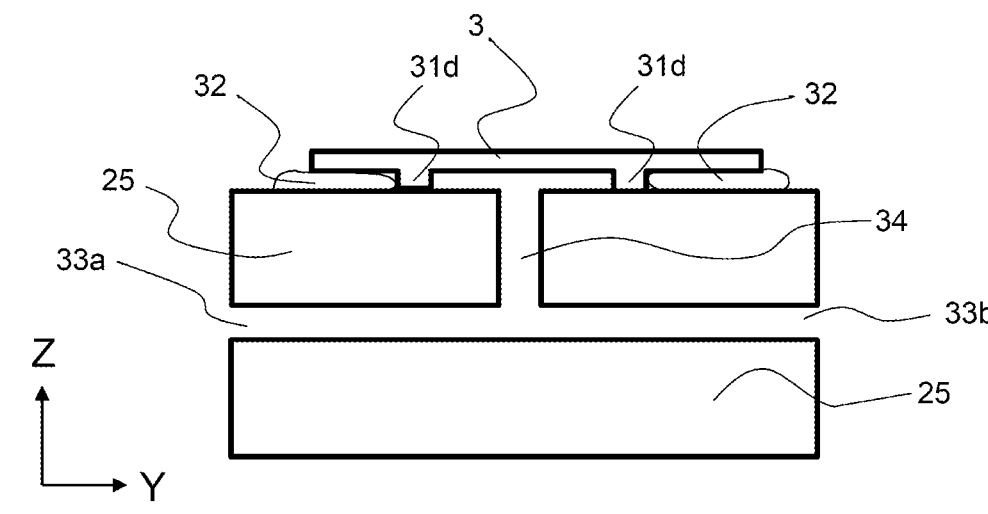
[FIG. 7]
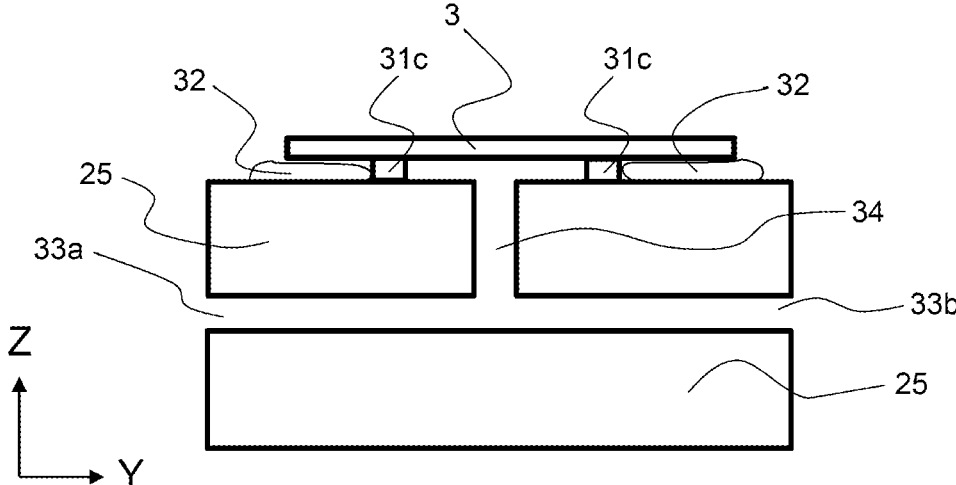

[FIG. 9]
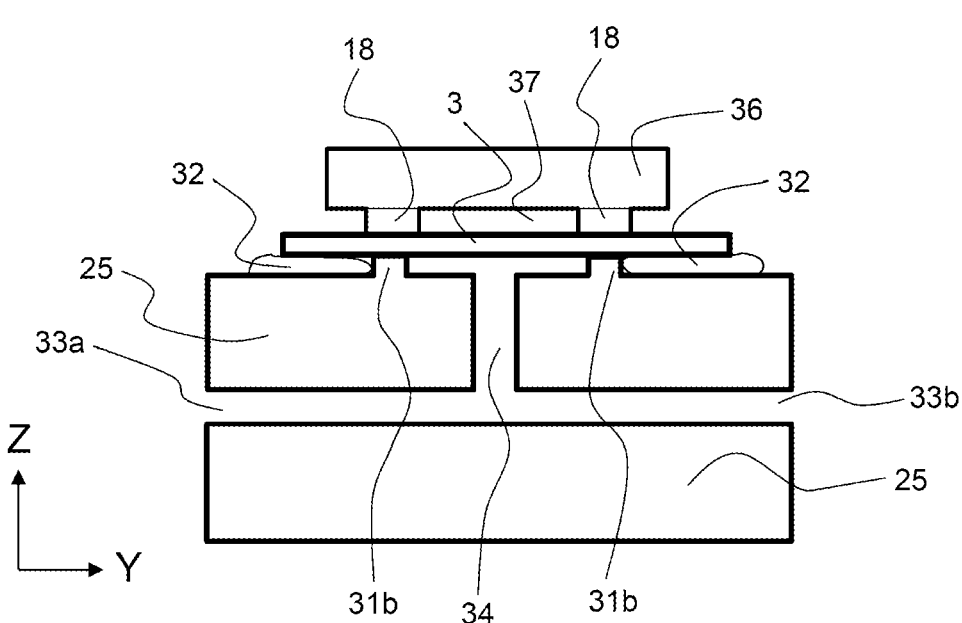

[FIG. 11]
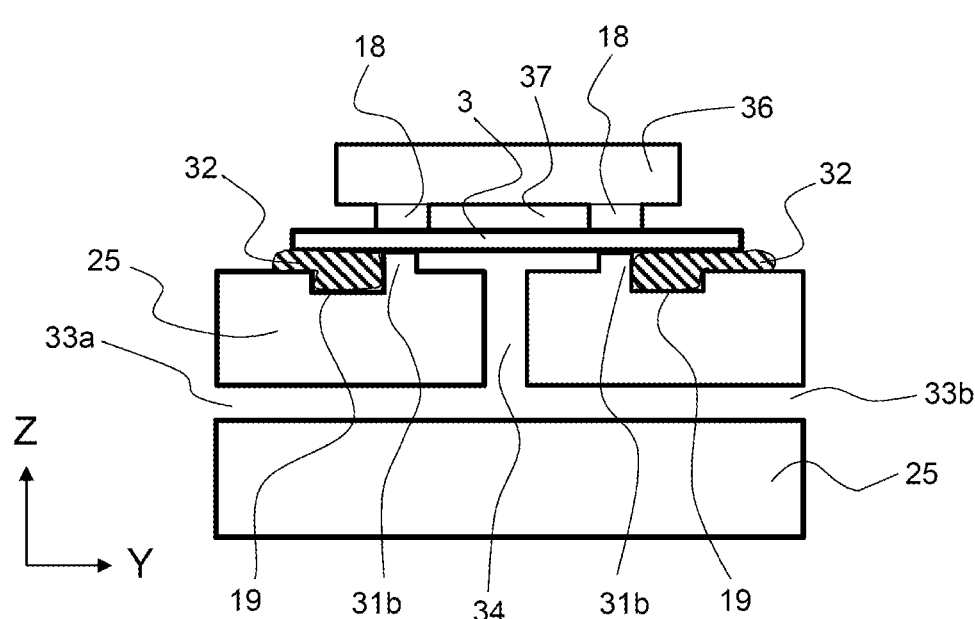

[FIG. 12]
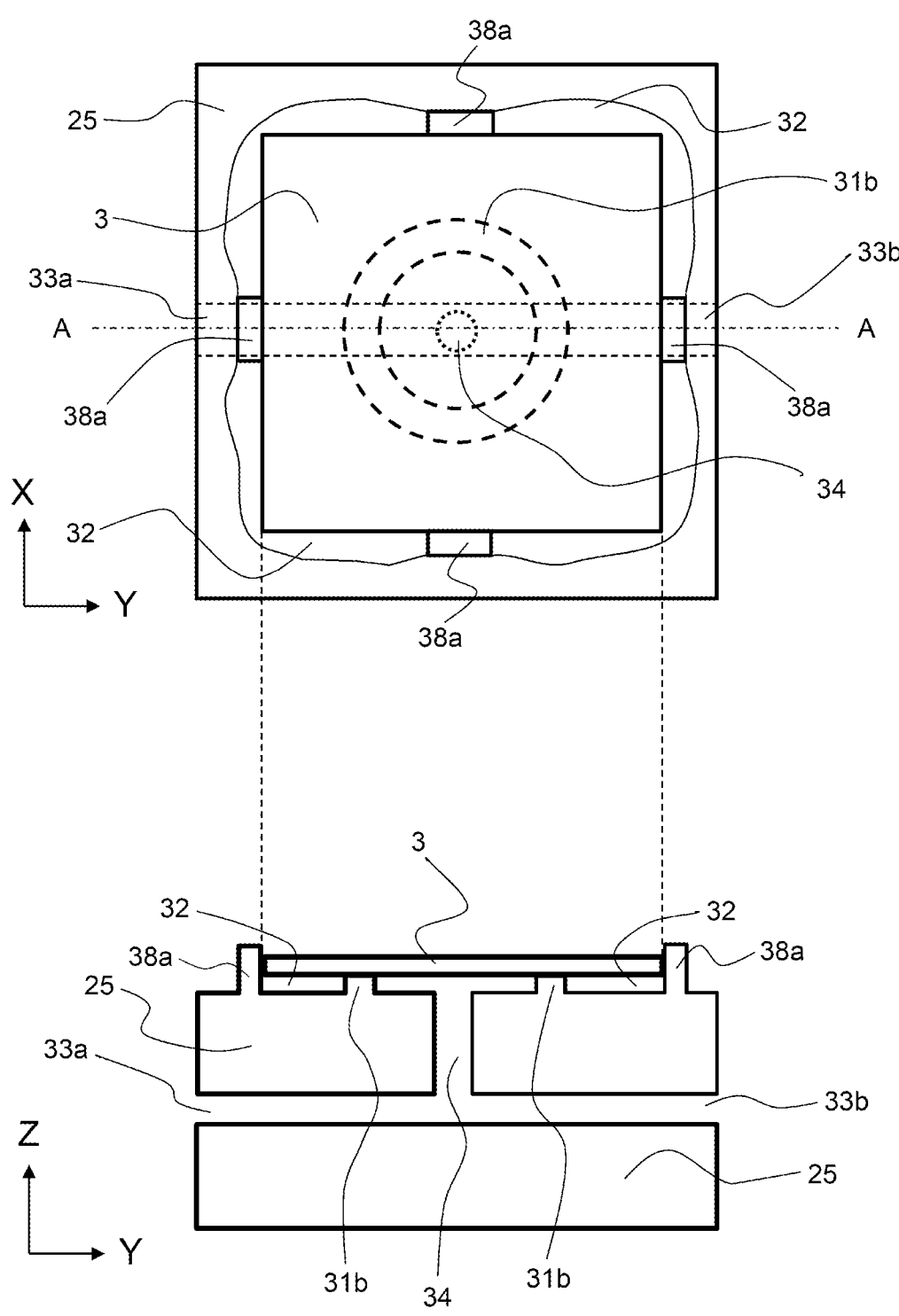

[FIG. 14]
15c
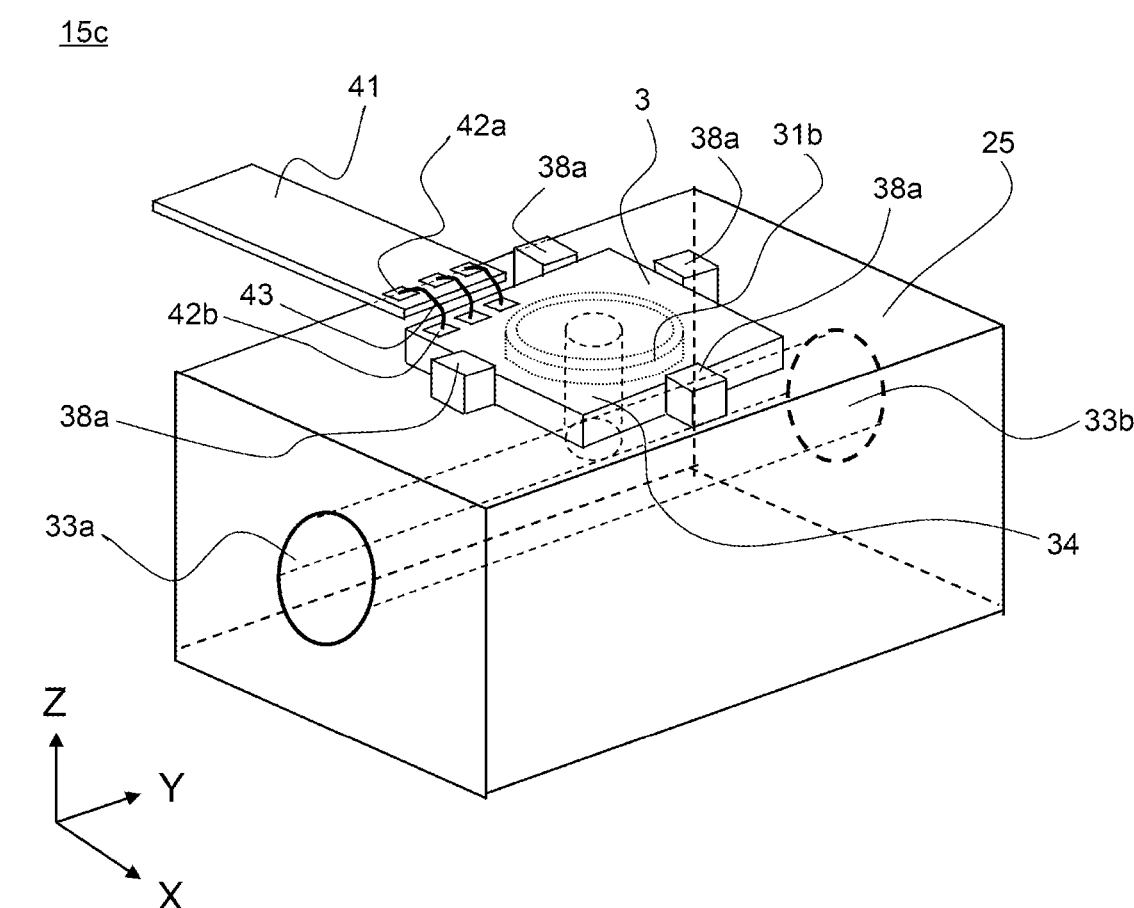

PRESSURE SENSOR MODULE AND DISPENSING DEVICE HAVING A DISTORTION DETECTION UNIT

TECHNICAL FIELD

The present invention relates to a pressure sensor module and a dispensing apparatus and relates to, for example, an application of a piezoresistive semiconductor element.

BACKGROUND ART

In general pressure sensors, diaphragms are formed in parts of semiconductor substrates in which piezoresistive elements or the like are formed, the diaphragms are deformed by external pressures of liquids or gases, and change amounts of the semiconductor elements are measured by electrically measuring resistance changes with Wheatstone bridge circuits or the like and converting the resistance changes into pressure values. As methods of manufacturing diaphragms formed in semiconductor substrates, diaphragms are formed by making parts of the semiconductor substrates thin applying anisotropic etching methods or dry etching methods for silicon to the back side of surfaces on which detection elements of the semiconductor substrates are formed. By etching the semiconductor substrates in this way, it is possible to keep a certain measurement area. Sensing units of semiconductor substrates in which piezoresistive elements and the like are formed are processed to be thin to certain thickness so that diaphragms can be easily deformed by adding hydraulic pressures.

PTL 1 discloses a pressure sensor that a semiconductor substrate formed a diaphragm is bonded on a glass substrate with an anodic bonding. The sensor is mounted near a pressure inlet hole of a package. An example is disclosed in which a protrusion is installed with a dimension matching an inner diameter of the pressure introduction hole at an exit of the pressure instruction hole formed inside a pressure introduction pipe and a thickness of a bonding layer is determined by a height of the protrusion.

PTL 2 discloses a structure that measures a precise pressure change near a nozzle in a dispensing apparatus to perform dispensing abnormality measurement or the like with high accuracy. In detail, a strain measurement unit is disposed on the way in a flow channel of a liquid to be dispensed, a first flow channel through which the liquid passes is included, rigidity of a first surface in contact with the first flow channel is lower than rigidity of a second surface, and the strain measurement unit is disposed on the first surface with the lower rigidity. Further, a structure in which a strain sensor chip is used as a part of an external wall of a flow channel is disclosed as another structure.

CITATION LIST

Patent Literature

PTL 1: JP2001-201415A
PTL 2: JP2020-071191A

SUMMARY OF INVENTION

Technical Problem

However, in the conventional techniques, there is a problem that is the conventional pressure sensors have a limit to accuracy of pressure measurement.

The structure of the pressure sensor disclosed in PTL 1 is superior in that a certain measurement area can be guaranteed by a diaphragm formed with etching from a back side of the pressure sensor. However, two bonding parts are formed in a structure attached to a glass base when a hole for the measurement is installed. Thus, productivity is not taken into consideration.

In a diaphragm formed by etching, a minute variation in thickness occurs due to the etching, and thus there is a problem that a variation in detection sensitivity of a pressure sensor occurs for each product. Since a protrusion with the same diameter as that of the pressure introduction hole is formed, a glass base is configured to be necessarily introduced between a protrusion and a sensor chip formed of silicon, so the flow channel inevitably has a vertically elongated structure. Therefore, when a pressure measurement target is a liquid, it is difficult to precisely be measured by an influence of air bubble entered in a longitudinal structure. In PTL 1, there is no description about measuring target of whether a liquid or a gas.

The structure disclosed in PTL 2 is superior in that measurement sensitivity is improved since the strain sensor chip is located near the nozzle in the structure measuring a slight pressure change of a dispensing apparatus. However, since the strain measurement unit is disposed on the first surface that has low rigidity and is in contact with the first flow channel, there is a possibility of pressure measurement sensitivity deteriorating. Further, there is a description that the strain measurement unit is used as a part of an external wall of the flow channel, but there is no description of a detailed structure.

An object of the present invention is to provide a pressure sensor module and a dispensing apparatus improving accuracy of pressure measurement.

Solution to Problem

According to an example of the present invention, a pressure sensor module includes:

a flow channel substrate in which a flow and a branch channels are formed; and a strain detection unit configured to detect a pressure.

The branch channel is branched from the flow channel and is connected to the strain detection unit at one end of the branch channel.

The distortion detection unit is disposed at least partially via a bond layer to block the one end of the branch channel.

A protrusion is formed surrounding the one end of the branch channel.

According to another example of the present invention, a dispensing apparatus includes the above-described pressure sensor module.

The present specification contains content disclosed in Japanese Patent Application No. 2021-081572, which is a basis of priority of the present application.

Advantageous Effects of Invention

According to the present invention, the pressure sensor module and the dispensing apparatus improve accuracy of pressure measurement.

For example, a pressure sensor module, in which a thin semiconductor substrate with piezoresistive elements is assembled on an exit of a branch channel jointed to a flow channel, is located near a nozzle, and thus it is possible to measure a slight pressure change of suction and discharge in the nozzle. Therefore, it is possible to provide the dispensing apparatus capable of detecting measurement dispensing abnormality and estimating a dispensing amount with high accuracy.

Other problems, configurations, and effects will be described in the following examples.

BRIEF DESCRIPTION OF DRAWINGS

FIG. 1 is a diagram illustrating a basic configuration of a dispensing apparatus according to Example 1.

FIG. 2 is a diagram illustrating an inside state of a pipe immediately after suction in the dispensing apparatus according to Example 1.

FIG. 6 is a sectional view illustrating a protrusion according to another modification of Example 1.

FIG. 7 is a sectional view illustrating a protrusion according to still another modification of Example 1.

FIG. 9 is a sectional view illustrating a structure of a pressure sensor with a cap according to Example 3.

FIG. 11 is a diagram illustrating a structure of a pressure sensor module according to Example 4.

FIG. 12 is a diagram illustrating a positioning protrusion structure according to Example 5.

FIG. 14 is an exploded perspective view illustrating a structure of a pressure sensor module according to Example 5.

DESCRIPTION OF EMBODIMENTS

Figure 3A:
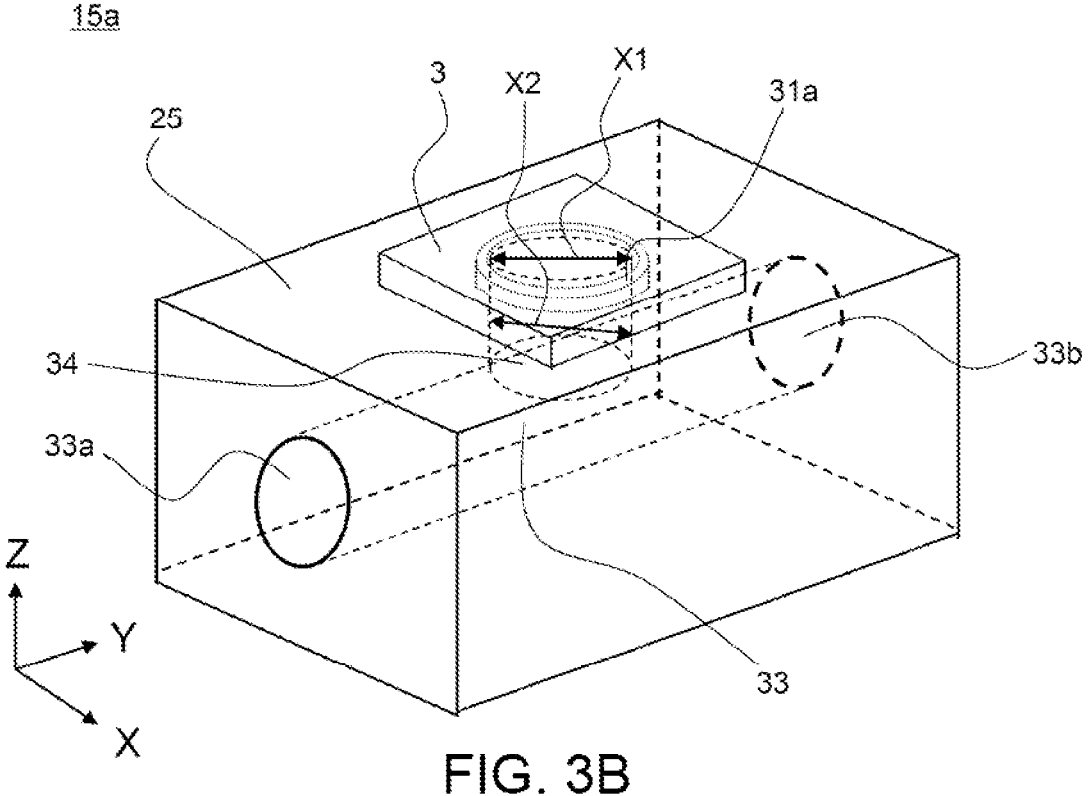
FIG. 3A is an exploded perspective view and FIG. 3B is a sectional view illustrating a structure of a pressure sensor module according to Example 1.

Hereinafter, examples of the present invention will be described with reference to the appended drawings.

Example 1

Example 1 of the present invention will be described with reference from FIGS. 1 to 3.

FIG. 1 shows a diagram illustrating a basic configuration of a dispensing apparatus 1 according to Example 1. The dispensing apparatus 1 includes a pressure sensor module 15. A flow channel system of the dispensing apparatus 1 includes a nozzle 2, a syringe pump 4, an electronic valve 5, a gear pump 6, and a system water tank 7. Each component is connected in relation to a pipe 8.

The syringe pump 4 is composed of a container 9, a plunger 10, a ball screw 11, and a drive motor 12. The drive motor 12 is controlled by a control substrate 14 like a motor that drives a sample dispensing mechanism 13 or the like. The pressure sensor module 15 is included inside an arm 16. The arm 16 can operate rotatably and vertically to carry a liquid to suction and discharge positions.

FIG. 2 is a diagram illustrating an inside state of the pipe 8 after suction. The inside of the pipe 8 is filled with system water 21 which is transmitted pressure by syringe. By transmitting a pressure from the syringe pump 4, it is possible to suck and discharge a liquid 22 from the nozzle 2.

When the liquid 22 is sucked from the nozzle 2, the plunger 10 inside the syringe pump 4 is pulled in a closed state of the electronic value 5. Conversely, when the liquid is discharged from the nozzle 2, the plunger 10 inside the syringe pump 4 is pushed into the container 9 in a state in which the electronic valve 5 is closed. When the liquid 22 such as a sample is sucked, air segment 23 for segmentation by the nozzle 2 is sucked so that the liquid 22 is not mixed with the system water 21 inside the pipe 8, and then the liquid 22 is sucked.

After discharge, cleaning of the nozzle 2 is performed. In cleaning of the nozzle 2, a cleaning water is brought to the external wall of the nozzle 2 and the system water 21 inside the flow channel is pushed out. In the pushing of the system water 21 inside the nozzle 2 in cleaning, by opening the electronic valve 5 and using a pressure of the gear pump 6, the system water 21 is driven out at a higher pressure than when the water is pushed out by the syringe pump 4.

To detect an abnormality such as clogging or idle suction which is likely to occur during a dispensing operation, the pressure sensor module 15 is included in the pipe 8. The pressure sensor module 15 monitors a pressure of the system water 21 and can detect a change in a pressure occurring when an abnormality such as clogging or idle suction of the nozzle 2 occurs.

In the present example, to detect a change in a pressure of the nozzle 2 sensitively, the pressure sensor module 15 is installed inside the arm 16 which is at a position as close as possible to the nozzle 2, but a position at which the pressure sensor module 15 is installed is not limited to the inside of the arm 16. For example, the pressure sensor module 15 may be installed along the pipe 8 inside the sample dispensing mechanism 13.

A structure of a pressure sensor module 15a according to the present example will be described with reference to FIG. 3. FIG. 3 is a diagram illustrating a structure of the pressure sensor module 15a according to the present invention. In the present specification and the appended drawings, to facilitate a description, it is assumed that a long-side direction, a short-side direction, and a height direction of the pressure sensor module 15a is the Y direction, the X direction and the Z direction, respectively, but the definition of the directions is not essential in implementation of the present invention.

Figure 3B:
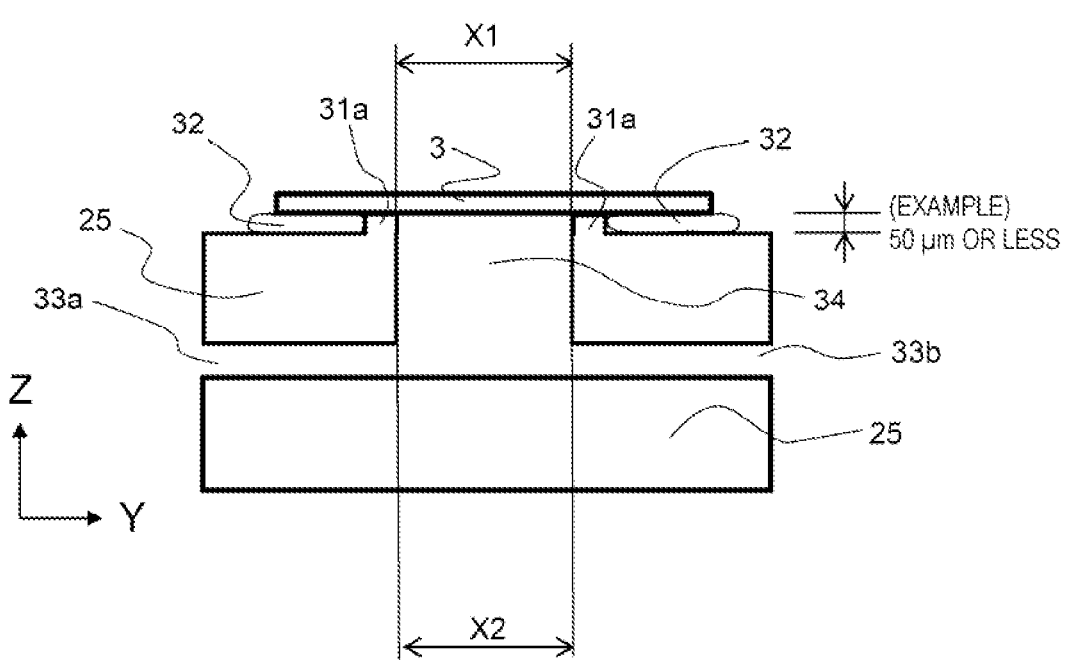

FIG. 3(*a*) is an exploded perspective view of the pressure sensor module 15a and FIG. 3(*b*) is a sectional view of the pressure sensor module 15a. The pressure sensor module 15a includes a flow channel substrate 25. In the flow channel substrate 25, a flow channel 33 is formed inside, screws (not illustrated) are provided in a flow channel entrance 33a and a flow channel exit 33b, and the flow channel 33 can be connected to the pipe 8 of the dispensing apparatus 1 illustrated in FIG. 2 via a joint.

Inside the flow channel substrate 25, a branch channel 34 branched from the flow channel 33 to the outer surface (in the Z direction) of the flow channel substrate 25 is formed. The pressure sensor module 15a includes a piezoresistive semiconductor element 3. The piezoresistive semiconductor element 3 is disposed to occupy a termination of the branch channel 34. The piezoresistive semiconductor element 3 is an example of a distortion detection unit that detects a pressure.

In this way, the branch channel 34 is branched from the flow channel 33 and is connected to the piezoresistive semiconductor element 3 at the termination (one end).

The piezoresistive semiconductor element 3 is disposed at least partially via the bond layer 32 so that the termination of the branch channel 34 is occupied. The piezoresistive semiconductor element 3 is joined to the flow channel substrate 25 via the bond layer 32.

Near the termination of the branch channel 34 of the flow channel substrate 25, a protrusion 31*a* is provided to surround the termination. In this present example, the protrusion 31*a* has an annular structure that surrounds an outer circumference of the branch channel 34 at the termination. In the present example, the protrusion 31*a* is formed as a part of the flow channel substrate 25. The bond layer 32 is provided to surround the circumference of the protrusion 31*a*.

A thickness of the bond layer 32 can be determined by a height of the protrusion 31*a*. In the present example, when it is assumed that the shape of the inner circumference of the protrusion 31*a* is circular, a dimension (inner diameter) X1 inside the protrusion 31*a* and a dimension (inner diameter) X2 inside the branch channel 34 have a relationship of X1=X2.

The piezoresistive semiconductor element 3 is flexurally deformed with a change in pressure of the system water 21 flowing in the flow channel and a change in a resistance value due to the deflection is measured to measure a pressure of the system water 21 flowing in a cylinder.

Figure 4A:
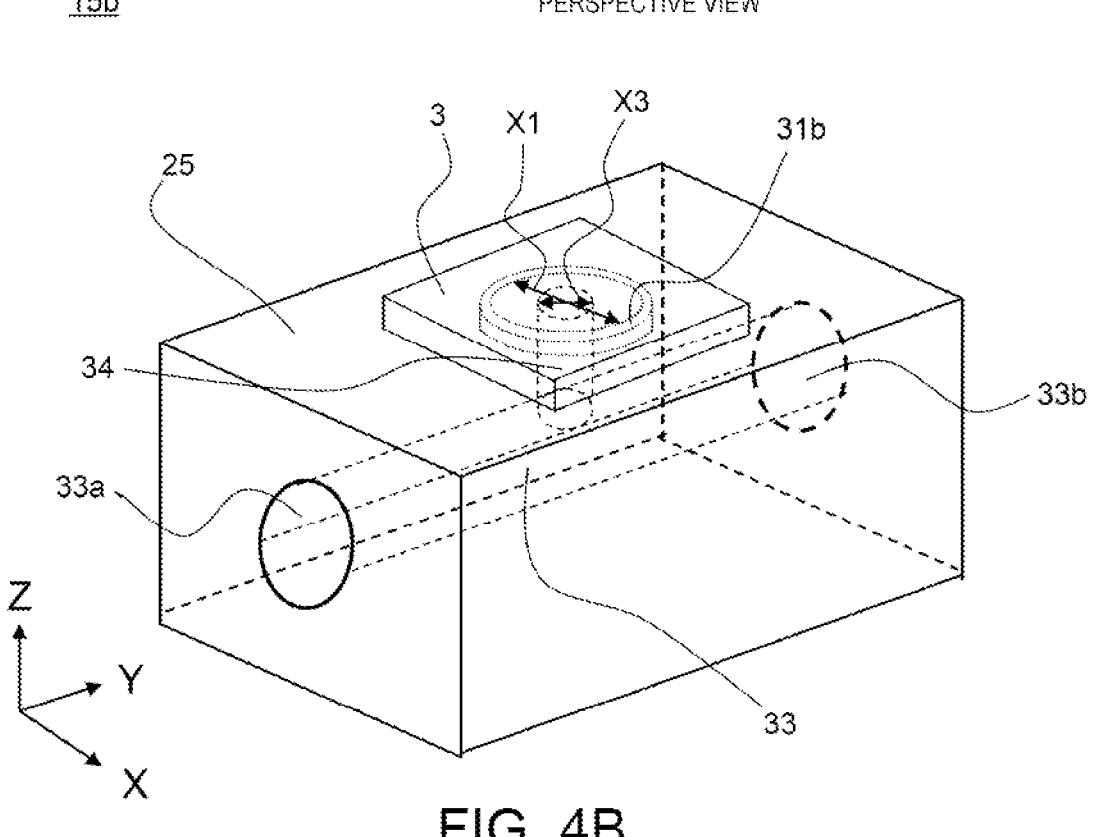
FIG. 4A is an exploded perspective view and FIG. 4B is a sectional view illustrating a structure of a pressure sensor module according to a modification of Example 1.
Figure 4B:
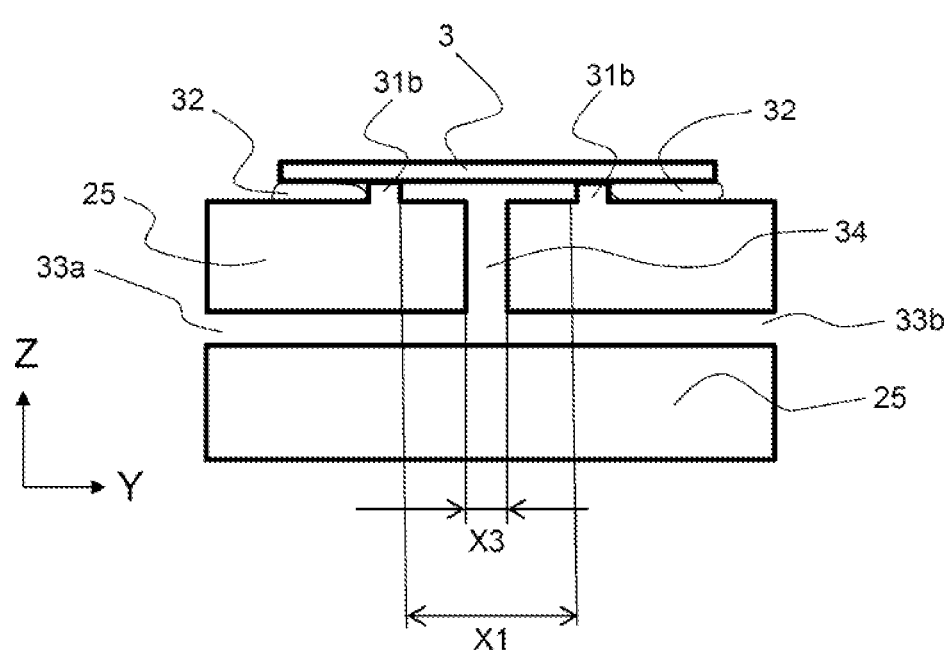

A structure of a pressure sensor module 15*b* according to a modification of Example 1 will be described with reference to FIG. 4. FIG. 4 is a diagram illustrating the structure of the pressure sensor module 15*b* according to the present invention. FIG. 4(*a*) is an exploded perspective view of the pressure sensor module 15*b* and FIG. 4(*b*) is a sectional view of the pressure sensor module 15*b*. Hereinafter, a description of common portions to those of Example 1 will be omitted in some cases.

A protrusion 31*b* is provided near the termination of the branch channel 34 of the flow channel substrate 25, and the bond layer 32 is provided to surround the circumference of the protrusion 31*b*. The protrusion 31*b* is formed outside of the branch channel 34. As compared with a dimension (inner diameter) X3 inside the branch channel 34, a dimension (inner diameter) X1 inside the protrusion 31*b* has a relationship of X3<X1. That is, an inside dimension of the protrusion 31*b* is greater than an inside dimension of the branch channel 34.

The piezoresistive semiconductor element 3 is deformed with a change in pressure of the system water 21 flowing in the flow channel and a change in a resistance value due to the distortion is measured to measure a pressure of the system water 21 flowing in a cylinder.

When a pressure is applied to the branch channel 34 by the system water, a volume of the branch channel in the structure of FIG. 4 is less than a volume of the branch channel illustrated in FIG. 3. Therefore, a structure in which pipe resistance decreases and a response speed of a pressure measurement can be made fast is realized.

On the other hand, a pressure of the system water is also applied to the inner diameter of the protrusion 31*b*, the piezoresistive semiconductor element 3 is flexurally deformed, and the deflection is measured. However, an area contributing to the flexural deformation is determined by the inner diameter of the protrusion 31*b*. Therefore, in this structure, an inner diameter dimension of the protrusion 31*b* may be greater than an inner diameter dimension of the branch channel 34.

A material of the piezoresistive semiconductor element 3 applied to FIGS. 3 and 4 is preferably silicon. For example, a thickness is preferably 100 μm or less and is more preferably 50 μm or less. When the thickness of the silicon is thin, a deformation region can be expanded with respect to a minute pressure variation, and thus it is possible to improve detection accuracy.

In a thin film processing method for the piezoresistive semiconductor element 3, grinding and chemical mechanical polishing (CMP) can be applied to form a thin film. In this method, a variation in thickness rarely occurs and the piezoresistive semiconductor element with a uniform thickness can be formed, and thus productivity is excellent.

When the piezoresistive semiconductor element 3 is formed thinly by thin film processing, an electric leakage possibility is assumed due to the structure of the piezoresistive semiconductor element 3 or electric conductivity of a silicon material. However, measures can be taken against this, for example, by forming an insulating material of a thin film on the surface of the piezoresistive semiconductor element 3. To improve adhesion with an adhesive material used in the bond layer 32, a thin metal film or the like may be formed on the surface of the piezoresistive semiconductor element 3 or the surface of the flow channel substrate 25.

An epoxy-based adhesive, a silver paste, a thermal diffusion bond, a thermosetting adhesive, a UV addition type adhesive, a low-melting point glass, or the like can be applied to the bond layer 32. As a material of the flow channel substrate 25, stainless steel is preferable and a metal with high corrosion resistance (for example, aluminum or titanium) may be applied. Further, a resin material such as acrylic may be applied.

As an example of a processing method for the protrusions 31*a* and 31*b*, in the case of a metal and a resin material, after the protrusion is formed with a milling machine, grinding is performed until a predetermined thickness is obtained, so that the protrusion with a goal height can be formed. Any widths of the protrusions 31*a* and 31*b* can be determined in accordance with a size or the like of the piezoresistive semiconductor element 3 and can be freely selected, for example, in the range from tens of microns to a few millimeters. Shapes of the protrusions 31*a* and 31*b* can also be freely selected from circles, ellipses, polygons, and the like.

Any heights of the protrusions 31*a* and 31*b* can be designed. When a structure in which the thin piezoresistive semiconductor element 3 is provided directly at the termination of the branch channel is adopted, a change in pressure of the system water flowing in the flow channel can be detected with high accuracy because a distance to the termination of the branch channel is short, and thus there is the advantage that a pressure detection speed is fast. Therefore, as the heights of the protrusions 31*a* and 31*b*, for example, 100 μm or less is suitable and 40 μm or less is more suitable.

As illustrated in FIG. 3(*b*), when protrusion heights of the protrusions 31*a* and 31*b* are set to 50 μm or less, the bond layer 32 also accordingly becomes thin. Therefore, it is possible to inhibit expansion of the bond layer 32 in association with a change in condition (an increase in temperature), and thus it is possible to present deformation of the piezoresistive semiconductor element 3.

In the present example, the piezoresistive semiconductor element 3 which is the distortion detection unit includes a thin semiconductor element, and thus can measure a pressure with high accuracy. As a modification, a distortion gage, a piezoelectric element, or the like may be applied as the distortion detection unit without being limited to the piezoresistive semiconductor element.

Figure 5A:
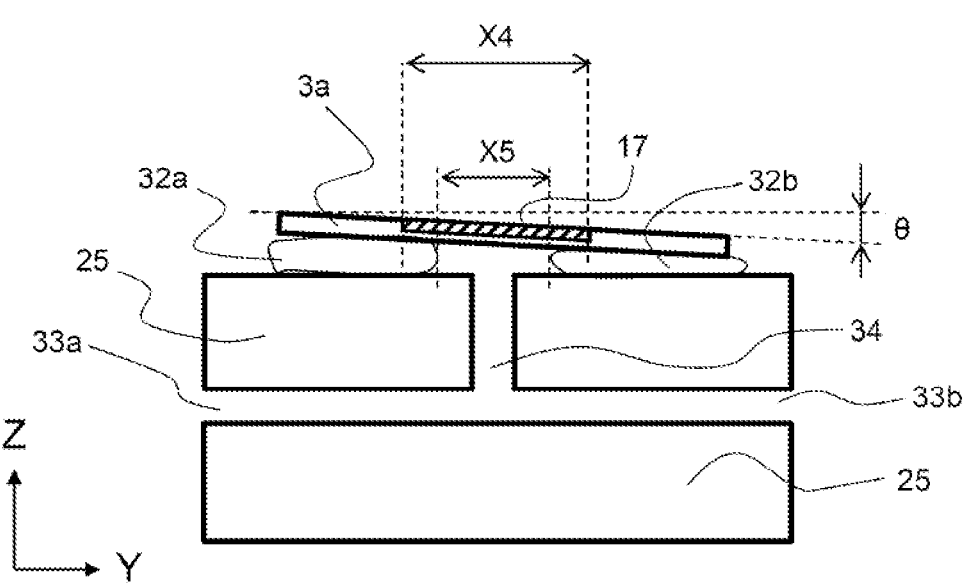
FIGS. 5A and 5B are sectional views illustrating an effect of the pressure sensor module of FIG. 4.

Next, effects of the protrusion 31b formed in the piezoresistive semiconductor element 3 will be described with reference to FIG. 5. FIG. 5(a) illustrates a reference example for comparison and corresponds to a case where the piezoresistive semiconductor element 3 is mounted via the bond layer 32 (32a and 32b) in a structure in which no protrusion is formed near the termination of the branch channel 34 formed inside the flow channel substrate 25.

Figure 5B:
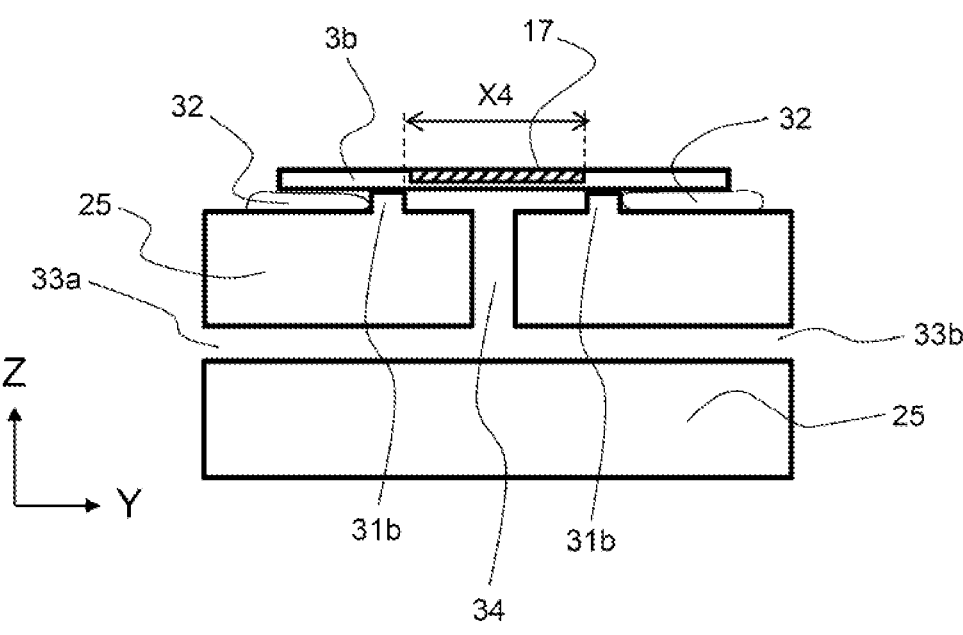

FIG. 5(b) corresponds to the configuration of FIG. 4 and illustrates a case where the piezoresistive semiconductor element 3 is mounted via the bond layer 32 in a structure in which the protrusion 31b is formed near the termination of the branch channel 34 formed inside the flow channel substrate 25.

A range in which the piezoresistive semiconductor element 3 is deformed by a hydraulic pressure is assumed to be a deformation unit 17. In FIG. 5, the deformation unit 17 is a region of a one-side surface of the piezoresistive semiconductor element 3, but may be a region penetrating from one surface to the other-side surface of the piezoresistive semiconductor element 3.

From FIG. 5(a), in a structure in which no protrusion is formed on the surface of the flow channel substrate 25, the piezoresistive semiconductor element 3a is a thin film, and thus handling is difficult, during mounting. Even when a dedicated jig is applied, it can be predicted that mounting in parallel to the surface of the flow channel substrate 25 is difficult. Therefore, an influence of viscosity of the bond layers 32a and 32b is easily exerted. When the viscosity is low, the thickness is easily changed.

As a result, even when a load is applied in parallel, there is a possibility of the piezoresistive semiconductor element 3 being mounted at an angle which is not 0 and corresponds to a difference θ in height because of a difference in internal stress of the bond layer (a difference in thickness between the bond layers 32a and 32b) when the bond layer solidifies.

When the piezoresistive semiconductor element 3a is pressed tightly against the bond layer, the bond layer floats in the Y direction. Therefore, even when a necessary deformation region of the piezoresistive semiconductor element 3 which should be deformed by a hydraulic pressure is a range of X4, an actual deformation region is restricted to a range of X5, and thus there is concern of performance deteriorating. That is, the deformation unit 17 cannot be deformed outside of the range of X5.

On the other hand, when a bond layer with high viscosity is applied, the bond layer floats in the Y direction at the time of tight pressing of the piezoresistive semiconductor element 3a against the bond layer. Therefore, the deformation region is restricted similarly, and thus performance deteriorates.

In the configuration of FIG. 4, as illustrated in FIG. 5(b), a protrusion 31b is formed on the surface of the flow channel substrate 25. Therefore, the bond layer 32 does not intrude inside and an extra adhesive projects out to the outer circumference of the piezoresistive semiconductor element 3b so that the film thickness of the bond layer can be constant. In this example, the height of the protrusion 31b is equal to the thickness of the bond layer 32, and thus the piezoresistive semiconductor element 3b can be mounted in parallel to the surface of the flow channel substrate 25.

In this example, an inside area of the protrusion 31b matches a pressure measurement area (that is, the area of the deformation unit 17) of the piezoresistive semiconductor element 3b. In such a configuration, the deformation unit 17 can be deformed in all the appropriate range X4.

As described above, accuracy of pressure measurement is improved in the pressure sensor modules 15a and 15b and the dispensing apparatus 1 according to Example 1.

There is a possibility of a part (a component that has low viscosity and is easily moved by capillarity) of the bond layer 32 intruding into a contact portion between the protrusion 31b and the piezoresistive semiconductor element 3b. When the protrusion 31b is provided outside of the deformation region of the piezoresistive semiconductor element 3b, the deformation region can be appropriately guaranteed even if the bond layer 32 intrudes into the contact portion.

As a modification, another structure can be applied other than the structure in which the protrusion is formed in the flow channel substrate 25. FIG. 6 is a sectional view illustrating another protrusion structure according to a modification of Example 1. In this example, a protrusion 31d is formed in the piezoresistive semiconductor element 3.

The protrusion 31d is configured to be integrated on the surface of the piezoresistive semiconductor element 3. As a forming method, for example, a thick-film resist or polydimethylsiloxane (PDMS) is coated on a surface on which a piezoresistor of the piezoresistive semiconductor element 3 is not formed, and the protrusion can be formed with a thickness of tens of μm by patterning in accordance with a photolithographic technique. In this configuration, it is not necessary to form a protrusion on the surface of the flow channel substrate 25 and a thickness of the bond layer can be determined by a thickness of the protrusion 31d.

FIG. 7 is a sectional view illustrating a protrusion structure according to still another modification of Example 1. An object of this example is to cause the thickness of the bond layer and a deformation range by a pressure of the piezoresistive semiconductor element 3 to be constant. Therefore, as illustrated in FIG. 7, a spacer 31c is pinched and the bond layer 32 is provided around the spacer 31c to fix the piezoresistive semiconductor element 3.

As material of the spacer 31c, any of various materials such as stainless steel, resin, a rubber material, and Teflon (registered trademark) can be applied. A cross-sectional shape of the spacer 31c is preferably a rectangle as illustrated in the drawing, but a trapezoid, another rectangle, an ellipse, a circle, or the like can be applied. When a spacer with a circular cross-sectional surface such as an O ring is applied, the deformation may be realized with a pressure applied to the piezoresistive semiconductor element 3. A 3-dimensional shaping technique may be applied to the spacer 31c other than a forming method by machining.

Example 2

Example 2 of the present invention will be described with reference to the sectional view of FIG. 8. Hereinafter, a description of common portions to those of Example 1 will be omitted in some cases.

Figure 8A:
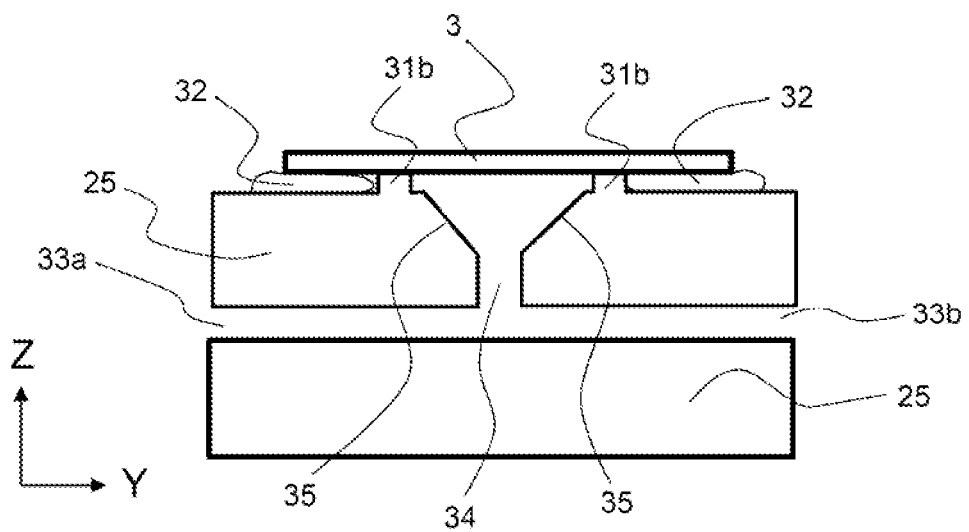
FIGS. 8A and 8B are sectional views illustrating a structure of a pressure sensor module according to Example 2.
Figure 8B:
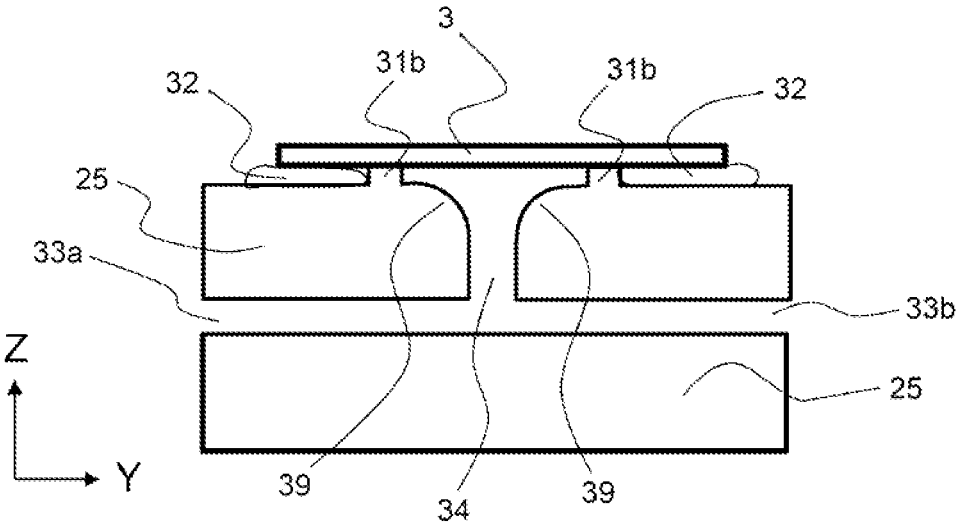

FIG. 8(a) illustrates a structure in which a slope surface 35 is formed in a circumferential shape near the exit of the branch channel 34 of the flow channel substrate 25. FIG. 8(b) illustrates a structure in which a curved surface 39 is formed in a circumferential shape near the exit of the branch channel 34 of the flow channel substrate 25. In both the structures, the protrusion 31b formed in the flow channel substrate 25 is formed outside of the exit of the branch channel 34. The bond layer 32 is formed in the outer circumference of the protrusion 31*b*.

In the structures of FIGS. 8(*a*) and 8(*b*), chamfered portions are formed on the termination side of the branch channel 34. The chamfered portion is formed with a tapered surface of which a cross-section has a straight shape in the example of FIG. 8(*a*) and is formed with a curved surface of which a cross-section has a curved shape in the example of FIG. 8(*b*). Since an open structure is realized near the exit of the branch channel of the flow channel substrate 25, a hydraulic pressure is smoothly applied to the piezoresistive semiconductor element 3 when a pressure of the system water is measured. Therefore, a pressure resistance of the system water decreases and a measurement speed is improved. In this way, another shape may be applied as long as a chamfered structure is realized near the exit of the branch channel 34 of the flow channel substrate 25.

Example 3

Example 3 of the present invention will be described. Hereinafter, a description of common portions to those of Example 1 or 2 will be omitted in some cases.

The piezoresistive semiconductor element is formed finally as a thin film by grinding and chemical mechanical polishing. Therefore, there is a possibility of the simplex piezoresistive semiconductor element formed as the thin film being damaged when the piezoresistive semiconductor element is joined to the flow channel substrate 25.

A configuration according to Example 3 will be described with reference to the sectional view of FIG. 9 as a structure for preventing damage and improving handling at the time of joining in the simplex piezoresistive semiconductor element.

As illustrated in FIG. 9, the pressure sensor module includes a cap 36 that covers the piezoresistive semiconductor element 3 from the upper side (opposite side of the branch channel 34). The cap 36 is joined with the piezoresistive semiconductor element 3 by a resin bond layer 18. A space 37 is formed between the piezoresistive semiconductor element 3 and the cap 36. A structure in which a deformed portion does not come into contact with the cap 36 is realized even when the piezoresistive semiconductor element 3 is deformed because of application of a pressure.

Since an electrode pad for exchanging an electrical signal with the outside is formed in the periphery of the end of the piezoresistive semiconductor element 3 in some cases, a dimension of the cap 36 may be formed to be smaller than the outer diameter dimension of the piezoresistive semiconductor element 3.

As a material of the cap 36, silicon or glass can be applied. As a material of the resin bond layer 18, a polymer material such as benzocyclobutene can be applied. The material is a material that enables a thick film to be formed and can be patterned and a bonding strength can be obtained by adding a temperature.

Figure 10A:
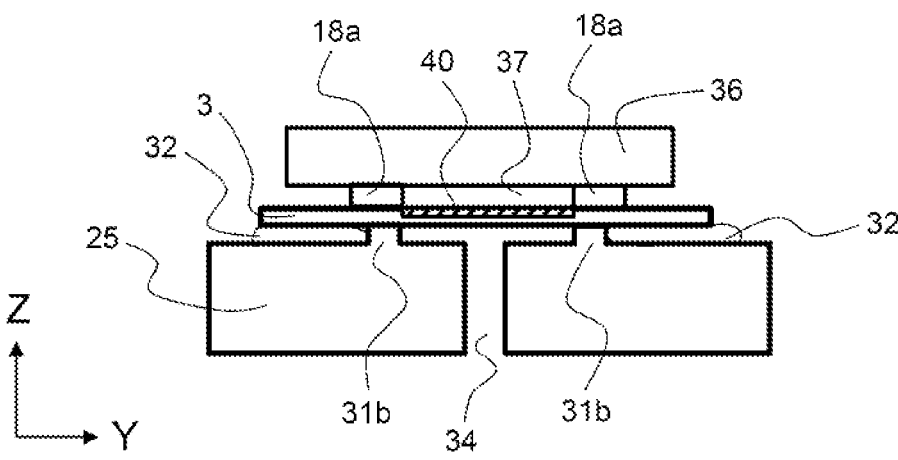
FIGS. 10A to 10C are sectional views illustrating a positional relationship of a cap and a protrusion according to Example 3.
Figure 10B:
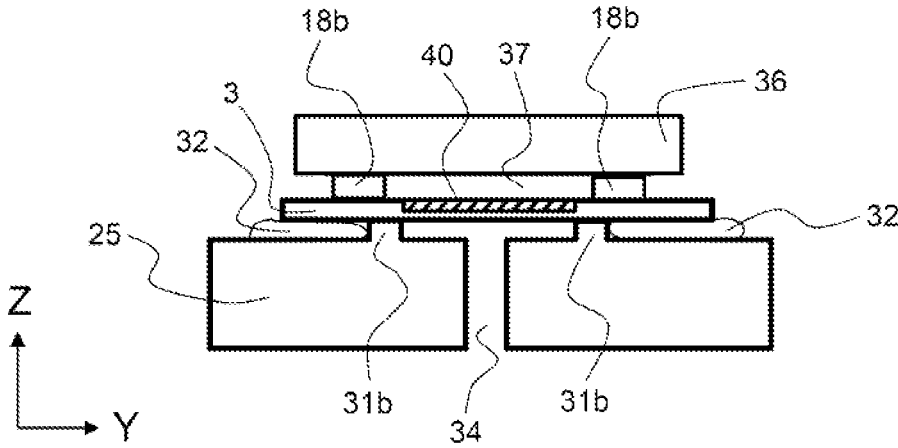
Figure 10C:
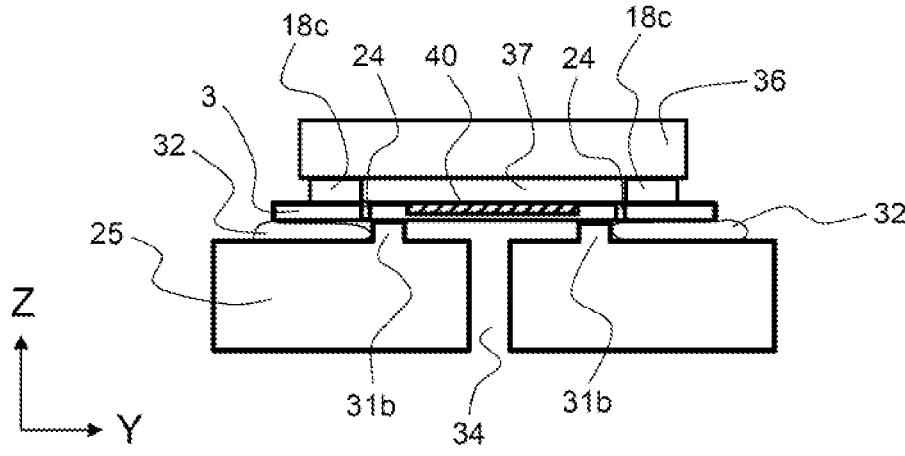

Next, a positional relationship between the resin bond layer 18 and the protrusion 31*b* formed on the surface of the flow channel substrate 25 will be described with reference to the sectional view of FIG. 10. In the piezoresistive semiconductor element 3, a region deformed with application of a pressure is referred to as a deformation unit 40. In FIG. 10, the deformation unit 40 is a region of a one-side surface of the piezoresistive semiconductor element 3, but may be a region penetrating from a one-side surface to the other-side surface of the piezoresistive semiconductor element 3.

FIG. 10(*a*) illustrates a case where an inside dimension (inner diameter) of a resin bond layer 18*a* formed in the cap 36 is the same as an inside dimension (inner diameter) of the protrusion 31*b* formed in the flow channel substrate 25. In this example, in deformation of the piezoresistive semiconductor element 3 by a hydraulic pressure, the deformation unit 40 is displaced in the Z direction within a range of the dimension (the inner diameter) of the resin bond layer 18*a* formed below the cap 36.

FIG. 10(*b*) illustrates a state where a resin bond layer 18*b* formed in the cap 36 and the protrusion 31*b* formed in the flow channel substrate 25 overlap each other partially. In this example, in deformation of the piezoresistive semiconductor element 3 by a hydraulic pressure, the deformation unit 40 is displaced in the Z direction within a range of the inner diameter of the resin bond layer 18*b* formed below the cap 36.

On the other hand, FIG. 10(*c*) illustrates a case where the inside dimension (inner diameter) of a resin bond layer 18*c* formed in the cap 36 is greater than an outside dimension (outer diameter) of the protrusion 31*b* formed in the flow channel substrate 25. In this structure, when the piezoresistive semiconductor element 3 is joined with the bond layer 32 interposed therebetween, positions of the resin bond layer 18*c* formed in the cap 36 and the protrusion 31*b* do not match when viewed in the Z direction. Therefore, a crack 24 occurs inside the piezoresistive semiconductor element 3 due to shearing stress at the time of bond, and there is a possibility of breaking. Therefore, a reinforcement structure or the like for preventing the crack is necessary.

To avoid such a reinforcement structure, as illustrated in FIGS. 10(*a*) and 10(*b*), a region where the cap 36 comes into contact with the piezoresistive semiconductor element 3 and a region where the protrusion 31*b* comes into contact with the piezoresistive semiconductor element 3 may overlap each other at least partially when viewed in an axial direction of the branch channel 34.

Example 4

Example 4 of the present invention will be described with reference to FIG. 11. Hereinafter, a description of common portions to those of any of Example 1 to 3 will be omitted in some cases.

FIG. 11 is a sectional view illustrating another structure of the flow channel substrate 25 according to the present example. Example 4 differs from Examples 1 to 3 in that the flow channel substrate 25 includes a groove 19 outside of an outer edge of the protrusion 31*b* and a part of the bond layer 32 can be disposed in the groove 19. Since the other configurations are similar to those of the other examples (for example, FIG. 9), description thereof will be omitted.

By applying such a structure, a surface area of a contact portion between the bond layer 32 and the flow channel substrate 25 can increase and the thickness of the bond layer 32 can be sufficiently guaranteed. Therefore, it is possible to improve an adhesive strength of the bond layer 32. It is possible to decrease a projection amount to the outer circumference of the bond layer 32.

Example 5

Example 5 of the present invention will be described with reference to FIG. 12. Hereinafter, description of common portions to those of any of Example 1 to 4 will be omitted in some cases.

FIG. 12 is a plan view and a sectional view illustrating a structure of the flow channel substrate 25 according to the present example. Positioning protrusions 38a for positioning a position of the piezoresistive semiconductor element 3 are formed in the flow channel substrate 25. The positioning protrusions 38a project in the Z direction from the flow channel substrate 25. In the present example, the positioning protrusions 38a are installed at four locations and the piezoresistive semiconductor element 3 is installed inside the positioning protrusions 38a. The positioning protrusion 38a regulates movement of the piezoresistive semiconductor element 3 on an XY plane, which facilitates positioning.

In such a configuration, a relative position to the branch channel 34 and the protrusion 31b formed in the flow channel substrate 25 can be determined with high precision when the piezoresistive semiconductor element 3 which is a thin film is disposed. In such a structure, the position of the branch channel 34 formed in the flow channel substrate 25 can match the positions of the protrusion 31b and the piezoresistive semiconductor element 3 with accuracy of tens of microns, and thus measurement accuracy becomes good even in deformation by a hydraulic pressure and a variation among products can be reduced.

The positioning protrusions 38a may be formed in the entire circumference of the piezoresistive semiconductor element 3. In the present example, however, the positioning protrusions 38a are partially disposed so that the bond layer 32 does not obstruct a projection amount to the outer circumference.

The positioning protrusions 38a can be applied to the structure illustrated in FIG. 12, but other positioning protrusions can be applied as a modification of Example 4.

Figure 13A:
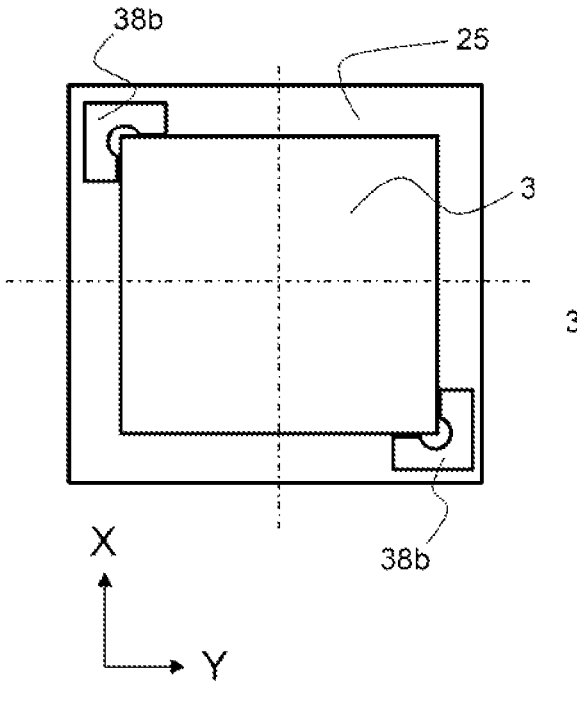
FIGS. 13A to 13C are plan views illustrating another positioning structure according to Example 5.

FIG. 13 are plan views of various modifications. FIG. 13(a) illustrates an example in which positioning protrusions 38b disposed in corners of the piezoresistive semiconductor element 3 are disposed at two locations. When the positioning protrusions 38b are disposed in the corners, planar portions are preferably present in the X and Y directions. The corners of the positioning protrusions 38b intersecting in the X and Y directions may be chamfered as illustrated. In this configuration, positioning can be achieved with a small number of positioning protrusions 38b.

Figure 13B:
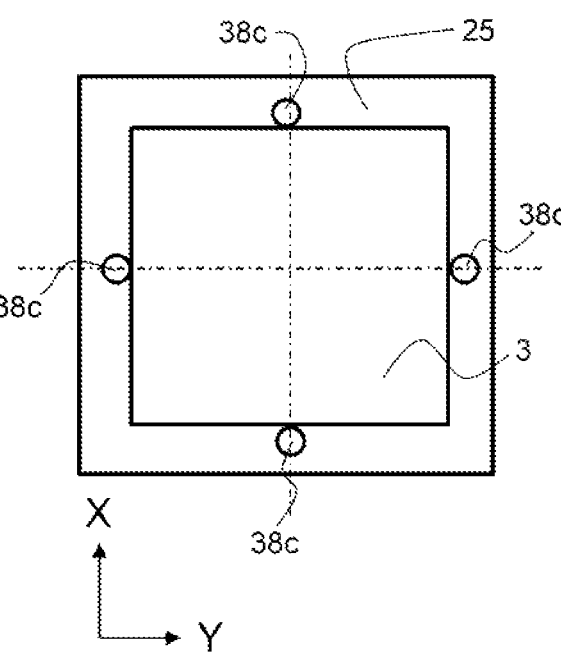

FIG. 13(b) illustrates an example in which circular positioning protrusions 38c are disposed in middle portions of the piezoresistive semiconductor element 3 in the X and Y directions. For the positioning protrusions 38c, a structure in which pin holes or screw holes are formed in the flow channel substrate 25 and pins are installed or a structure in which screws are inserted can be applied. In this structure, the positioning protrusions can be formed at low cost. In this configuration, the positioning protrusions 38c can also have a pin or screw function.

Figure 13C:
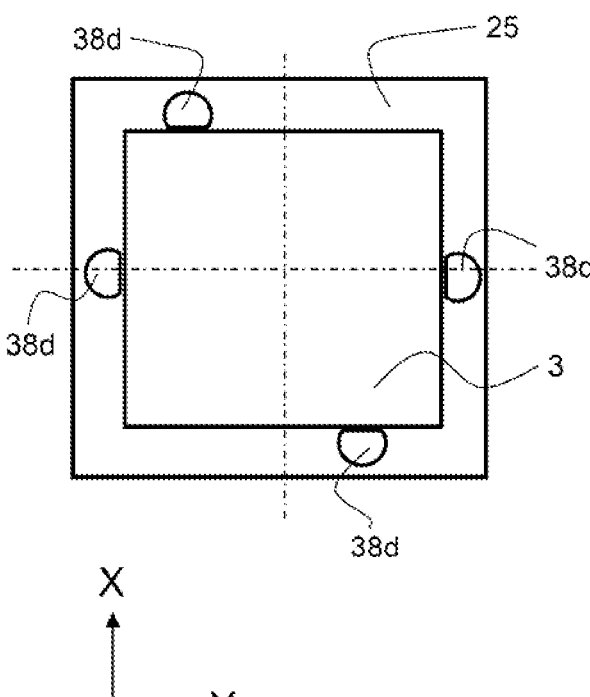

FIG. 13(c) illustrates an example in which some of positioning protrusions 38d are disposed at positions corresponding to the center of the piezoresistive semiconductor element 3 in the X direction and the positioning protrusions 38d are disposed at positions deviating from the center of the piezoresistive semiconductor element 3 in the Y direction. In the present example, in a positioning method for the piezoresistive semiconductor element 3, another structure may be used as long as the positioning protrusions are put in the outer circumference.

Next, an electric wiring example in the piezoresistive semiconductor element 3 mounted on a pressure sensor module 15c is illustrated in an exploded perspective view of FIG. 14. The piezoresistive semiconductor element 3 is mounted inside a region demarcated by the positioning protrusions 38a.

A plurality of electrode pads 42b are located in the piezoresistive semiconductor element 3 and are connected between wires 43 and electrodes pads 42a formed in an electric wiring flexible substrate 41. Gold wires and aluminum wires can be applied as the wires 43. Besides, an anisotropic conductive film (ACF) or the like may be applied for the connection.

When the system water flows in the flow channel 33, the system water flows in the branch channel 34 and a pressure is applied to the piezoresistive semiconductor element 3. When the pressure is applied, the piezoresistive semiconductor element 3 is deformed. The deformation is transmitted as an electric signal to the flexible substrate 41 to measure the pressure.

The present invention is not limited to the above-described examples, but various modifications and equivalent configurations are included within the gist of the scope of the appended claims. For example, the above-described examples have been described in detail to facilitate the description of the present invention and the present invention is not necessarily limited to all the described configurations. A part of a configuration according to a certain embodiment or modification can be replaced with a configuration according to another embodiment or modification, or a configuration according to another embodiment or modification can also be added to a configuration according to a certain embodiment or modification. Another configuration can be added to, deleted from or replaced with a part of a configuration according to each example or modification.

REFERENCE SIGNS LIST

1: dispensing apparatus
2: nozzle
3, 3a, 3b: piezoresistive semiconductor element (distortion detection unit)
4: syringe pump
5: electronic valve
6: gear pump
7: system water tank
8: pipe
9: container
10: plunger
11: ball screw
12: drive motor
13: sample dispensing mechanism
14: control substrate
15, 15a, 15b, 15c: pressure sensor module
16: arm
17: deformation unit
18, 18a, 18b, 18c: resin bond layer
19: groove
21: system water
22: liquid
23: air segment
24: crack
25: flow channel substrate
31, 31a, 31b, 31d: protrusions
31c: spacer
32, 32a, 32b: bond layer
33: flow channel
33a: flow channel entrance
33b: flow channel exit 34: branch channel 35: slope surface 36: cap 37: space 38a, 38b, 38c, 38d: protrusions 39: curved surface 40: deformation unit 41: flexible substrate 42a, 42b: electrode pad 43: wire All publications, patents, and patent applications cited in the present specification are claimed to be incorporated in the present specification.

The invention claimed is:

1. A pressure sensor module comprising:

a flow channel substrate in which a flow channel and a branch channel are formed; and a distortion detection unit configured to detect a pressure, wherein the branch channel is branched from the flow channel and is connected to the distortion detection unit at one end of the branch channel, wherein the distortion detection unit is disposed at least partially via a bond layer to block the one end of the branch channel, wherein a protrusion is provided to surround the one end of the branch channel, and an inside dimension of the protrusion is greater than an inside dimension of the branch channel, wherein the bond layer is configured to bond the distortion detection unit and the flow channel substrate, and wherein the bond layer is disposed so as to surround a circumference of the protrusion and is disposed at a position where the bond layer does not enter a region communicating with the branch channel surrounded by the protrusion so as not to be in contact with the region.

2. The pressure sensor module according to claim 1, wherein the flow channel substrate includes a groove outside of an outer edge of the protrusion.

3. The pressure sensor module according to claim 1, wherein the protrusion is formed in the distortion detection unit.

4. The pressure sensor module according to claim 1, wherein a height of the protrusion is equal to a thickness of the bond layer.

5. The pressure sensor module according to claim 1, wherein an inside area of the protrusion matches a pressure measurement area of the distortion detection unit.

6. The pressure sensor module according to claim 1, wherein a height of the protrusion is 50 μm or less.

7. The pressure sensor module according to claim 1, wherein a chamfered portion is provided at the one end of the branch channel.

8. The pressure sensor module according to claim 1, further comprising a cap configured to cover the distortion detection unit on an opposite side of the branch channel.

9. The pressure sensor module according to claim 8, wherein, when viewed in an axial direction of the branch channel, a region where the cap comes into contact with the distortion detection unit and a region where the protrusion comes into contact with the distortion detection unit overlap at least partially.

10. The pressure sensor module according to claim 1, wherein a positioning protrusion for positioning the distortion detection unit is formed in the flow channel substrate.

11. The pressure sensor module according to claim 1, wherein the distortion detection unit includes a thin semiconductor element.

12. A dispensing apparatus comprising the pressure sensor module according to claim 1.

* * * * *